United States Patent
Kummeke

[11] 3,953,784
[45] Apr. 27, 1976

[54] THYRISTOR CIRCUIT FOR CONVERSION OF DIRECT CURRENT TO ALTERNATING CURRENT

[75] Inventor: Heinrich Kummeke, Zorneding near Munich, Germany

[73] Assignee: Wacker Werke KG, Munich, Germany

[22] Filed: Feb. 26, 1975

[21] Appl. No.: 553,257

[30] Foreign Application Priority Data
Feb. 27, 1974 Germany............................ 2409418
Jan. 17, 1975 Germany............................ 2501767

[52] U.S. Cl. .......................... 321/45 C; 307/252 M
[51] Int. Cl.² ....................................... H02M 7/505
[58] Field of Search .............. 321/45 C; 307/252 M

[56] References Cited
UNITED STATES PATENTS
3,315,145  4/1967  Menard............................ 321/45 C
3,487,278  12/1969  Turnbull et al. ................. 321/45 C FOREIGN PATENTS OR APPLICATIONS
39,766  3/1970  Japan................................ 321/45 C Primary Examiner—William M. Shoop
Attorney, Agent, or Firm—Walter Becker

[57] ABSTRACT

A thyristor circuit for converting direct current to alternating current in which thyristors connecting opposite sides of a direct current circuit are alternately ignited while a commutating branch connected in parallel with the thyristors has further thyristors which are ignited alternately to extinguish each of the first mentioned thyristors before the other is ignited. The commutation branch includes two serially connected inductors interposed between the further thyristors which are bypassed by a damping diode. The juncture of the inductors is connected by a capacitor with the alternating current output line. The commutating branch may be supplied by a separator direct current voltage source which is coupled to the first mentioned direct current source by way of a diode.

11 Claims, 3 Drawing Figures

THYRISTOR CIRCUIT FOR CONVERSION OF DIRECT CURRENT TO ALTERNATING CURRENT

The present invention relates to a thyristor alternating rectifier bridge for static frequency transformers with a first direct current conductor of a fixed potential, a second direct current conductor of a potential positive relative to said first potential, said positive potential being variable between a minimum value near said potential of said first direct current conductor and a maximum value. More specifically, the invention relates to a thyristor alternating current rectifier bridge as set forth above which is provided with an alternating current exit conductor, a first and a second main thyristor interposed between said alternating current exit conductor and respectively the first and second direct current conductors and a commutation branch with a first and a second auxiliary thyristor which are respectively by one terminal through a series circuit of an inductance and a capacity connected to the alternating current exit conductor, and with the other terminal are connected to the first direct current conductor and are connected to a potential positive relative thereto. The main thyristors and the auxiliary thyristors are ignited by their control pulses conveyed to their control terminals, in such a sequence that the main thyristors alternately reach the igniting condition and each one thereof is prior to the igniting of the respective other main thyristor erased by means of a short take-over of the load current by the commutating circuit.

Thyristor alternating current rectifier bridges of the above mentioned type are employed in the driving art for instance for supplying three-phase motors with three-phase current of variable frequency. In this connection, for each current phase, an alternating current rectifier bridge will be required. Each of these bridges connects timewise tuned to the other bridges, alternately the alternating current output conductor to the first direct current conductor and the second direct current conductor respectively.

The change in frequency is effected by changing the pulse sequence frequency of the control pulses. Simultaneously the potential of the second direct current conductor, i.e., the amplitude of the alternating current, is adjusted proportionately to the frequency in order to make sure that the iron losses in three-phase motors or the like remain within premissible limits. The iron losses of three-phase motors increase considerably, as is well known, when with regard to a certain frequency too high a voltage is applied.

With the heretofore known thyristor alternating current rectifier bridges for static frequency transformers, the second auxiliary thyristor has its other current terminal connected to the second direct current conductor. This brings about that at low frequencies and consequently low potential only low supply voltages are applied to the second direct current conductor in the auxiliary thyristors. These low supply voltages bring about that the commutation circuit no longer reliably erases at low frequencies.

It is, therefore, an object of the present invention to provide a thyristor alternating current rectifier bridge which will overcome the above mentioned drawbacks.

It is a further object of this invention to further improve the thyristor alternating current rectifier bridge set forth in the previous paragraph to bring about that over the entire voltage range of the main supply source, the magnitude of the commutating currents will increase with increasing main supply voltage.

These and other objects and advantages of the invention will appear more clearly from the following specification in connection with the accompanying drawings, in which.

Figure 1:
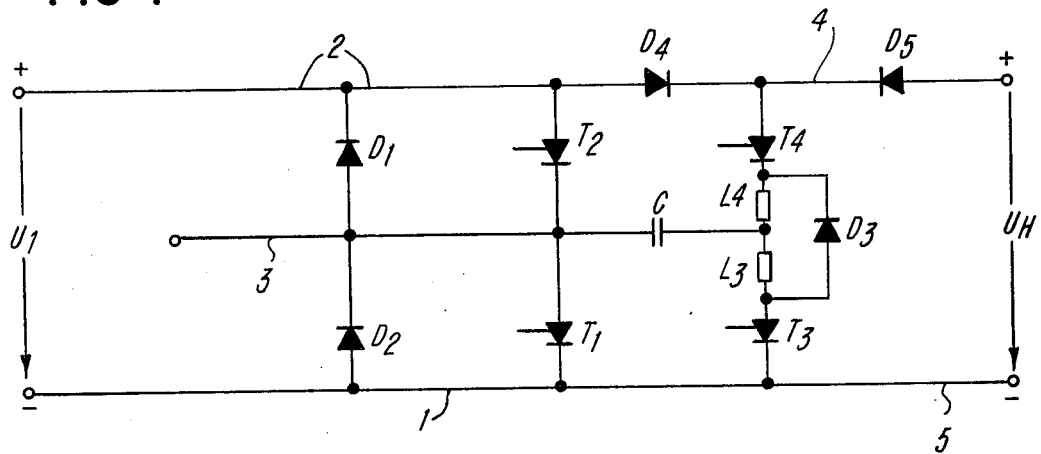
FIG. 1 is a circuit of a thyristor alternating current rectifier bridge according to the invention.

The present invention is characterized primarily in that the second auxiliary thyristor has one of its terminals connected to a fixed auxiliary potential.

With the thyristor alternating current rectifier bridge according to the invention, the supply voltage for the auxiliary thyristors can independently of the direct current supply for the main thyristors be kept at a value which assures a safer igniting of the auxiliary thyristors and also assures a sufficient erasing pulse even in the low frequency range, when the potential on the second direct current conductor has a value which is near the value of the potential of the first direct current conductor or is as high as the latter.

With a fixed commutation inductance and commutation capacity, the magnitude of the erasing or extinguishing current pulses emitted by the commutation circuit is proportional to the magnitude of the auxiliary potential. From this standpoint and in favor of as low a current load on the commutation circuit, it appears expedient to select the potential of the auxiliary voltage source relative to the potential of the first direct current conductor as high as possible. On the other hand, with increasing frequency, the load on the source furnishing the auxiliary potential increases continuously so that a strong auxiliary voltage source has to be provided when the commutation circuit draws its energy over the entire frequency range, i.e., the entire voltage range of the main current supply for the main thyristors from the auxiliary voltage source. In view of the finding that the danger of an inadmissible working operation of the commutation circuit exists only within the range of a relatively low frequency and correspondingly low voltages of the main current supply, it is suggested according to a further development of the invention that the auxiliary potential has a value between the minimum value and the maximum value of the potential on the second direct current conductor while between the other current terminal of the second auxiliary thyristor and the second direct current conductor there is interposed a diode which is so poled that it blocks when the potential on the second direct current conductor is lower than the auxiliary potential. In this way it will be assured that the strong main current supply source for the main transistors takes over the supply of the commutation circuit through the second direct current conductor, as soon as the variable voltage furnished by the main current supply source exceeds the fixed voltage of the auxiliary voltage source. As a result thereof, on one hand in the low frequency range there will be assured the safe operation of the commutation circuit which working operation goes back to the fixed auxiliary potential, while on the other hand, the auxiliary voltage source which furnishes the auxiliary potential can be designed considerably lower than if it would be necessary that the auxiliary voltage source also in the upper frequency range would have to supply energy to the commutation circuit. In this connection an expedient further development of the invention consists in that the current terminal of the second auxiliary thyristor is connected through a diode to the auxiliary potential whereby it will be assured that the auxiliary voltage source for the main current supply of the main thyristors does not represent a load as soon as the latter has taken over the current supply of the commutation circuit.

Another important further development of the invention consists in that when employing two inductances separately associated with the auxiliary thyristors and directly connected thereto, a diode with a pass direction from the first auxiliary thyristor to the second auxiliary thyristor is connected to the series circuit of the two inductances. Those terminals of said inductances which face away from the auxiliary thyristors are connected to each other and through the capacity are connected to the alternating current output conductor.

As a result of this arrangement, the condensor voltage will not have any undue values when the potential on the second direct current conductor is lower than the potential of the source of auxiliary voltage. This further development is based on the finding that the voltage is able under the preceding conditions to build itself up to values which are considerably greater than the voltage furnished by the auxiliary voltage source, and that this danger can be eliminated by a good dampening or loading of the oscillation of the condenser voltage. Such good dampening is realized in a simple, reliable manner when employing two inductances of its own for each auxiliary thyristor with the diode arranged in parallel thereto.

Referring now to the drawings in detail, the circuit illustrated therein comprises a first direct current conductor, which is connected to the zero pole of the non-illustrated direct current main supply line. The circuit illustrated in FIG. 1 furthermore comprises the second direct current conductor which is connected to the positive pole of the direct current main supply line. The reference numeral 3 designates the alternating current starting line. Line 3 is connected to the first direct current main line by a first main thyristor $T_1$ and a free wheeling diode $D_2$. Line 3 which comprises an extinguishing condenser C is furthermore connected to line 1 through the intervention of a first extinguishing inductance $L_3$ and the first auxiliary thyristor $T_3$.

Line 3 is connected to line 2 through the free wheeling diode $D_1$, and the second main thyristor $T_2$. Furthermore, line 3 is connected to line 2 by a second auxiliary thyristor $T_4$ and a second extinguishing inductance $L_4$. Arranged in parallel to the extinguishing inductances $L_3$ and $L_4$ is a dampening diode $D_3$. The arrangement furthermore comprises a take-over diode $D_4$ which is arranged between the second direct current conductor and the commutating circuit. $U_H$ designates the auxiliary voltage source for furnishing the auxiliary potential. The positive terminal of the DC-source of auxiliary voltage i connected to the anode of the thyristor $T_4$ via a first auxiliary conductor 4, and the negative terminal of the said DC-source of auxiliary positive voltage is connected to the first DC-supply conductor 1 and thus to the cathode of thyristor $T_3$ via a second auxiliary conductor 5. $D_5$ represents the uncoupling diode arranged in the current supply line from the auxiliary voltage source to the commutating circuit. By alternately igniting the main thyristors $T_1$, $T_2$, and the auxiliary thyristors $T_3$, $T_4$, the exit of the alternating current conductor 3 is once through the first direct current conductor 1 connected to the negative terminal and once through the second direct current conductor 2 to the positive terminal of the direct current main supply line. The igniting pulses are conveyed to the thyristors at the control inlets in a manner known per se, as referred to in the following table:

|  | Igniting cycles for one period | | | |
|---|---|---|---|---|
|  | I | II | III | IV |
| Ignition | $T_2$, $T_3$ | $T_4$ | $T_1$, $T_4$ | $T_3$ |
| Obtained Function | Alternating current output line is connected to the plus-potential | $T_2$ is extinguished | Alternating current output line is connected to the zero-potential | $T_1$ is extinguished |

The modulation is effected in such a way that the main thyristors will at no time simultaneously be in their igniting condition. The variable pulse sequence frequency is decisive for the frequency of the alternating current at the alternating current output line.

With this igniting cycle, it is an object of the auxiliary thyristors briefly through the commutating inductances $L_3$, $L_4$ and the commutation capacity C to take over the load current of the main thyristors $T_1$, $T_2$ so that the latter can be changed from passing condition to blocking condition. The sine shaped current pulse generated by the commutating device which current pulse passes in a direction opposite to the load current passing through the alternating current output line, through the corresponding main thyristor and respectively one of the two free wheeling diodes serving for short-circuiting undesired back currents, must be greater than the load current.

With fixed commutating inductance $L_3$, $L_4$ and commutating capacity C, the height of the current pulses is proportional to the size of the voltage at those terminals of the auxiliary thyristors $T_3$, $T_4$ which face away from each other. In order to make sure that this current pulse, for commutating the main thyristors will also at low voltage of the direct main supply line connected to the direct current conductors 1, 2 comprise a magnitude sufficient for extinguishing the main thyristors, this voltage is furnished by an auxiliary voltage source $U_H$. In order that with increasing frequency, the load of the source $U_H$ increases continuously through the commutating circuit, but on the other hand from a certain frequency value on the voltage of the direct current main supply source which voltage increases with the frequency, will be sufficient for obtaining a safe working of the commutating circuit, the commutating circuit is supplied by the source $U_H$ with energy only until the voltage of the main supply source has reached the above mentioned safe value. To this end, the fixed value of the voltage furnished by the auxiliary source $U_H$ lies between the minimum value and the maximum value of the voltage furnished by the direct current main supply line at the safe value, and the commutating circuit is through the take-over diode $D_4$ connected to the second direct current line. As soon as the positive potential on the second direct current conductor 2 exceeds the potential on the positive terminal of the auxiliary voltage source $U_H$, the take-over diode $D_4$ becomes conductive. The diode $D_5$ which at this time reaches its blocking condition will then after the current supply is taken over by the direct current main supply, prevent the source $U_H$ from becoming a load for the direct current main supply.

If the diode $D_4$ were lacking, it will be evident that when increasing value $U_1$ of the direct current main supply, the pulse shaped commutating current would currently decrease. The commutating circuit is preferably dimensioned for the condition that $U_1=U_H$.

In the illustrated circuit, the diode $D_5$ has only symbolic importance because for purposes of realizing the auxiliary voltage source $U_H$ a rectifier set will be necessary anyhow in which the rectifier is provided which carries out the function of the diode $D_5$.

The diode $D_3$ serves for dampening the oscillation of the voltage at the extinguishing condenser C in order that the condenser voltage will not materially increase beyond the voltage furnished by the auxiliary source $U_H$. Without the dampening by the diode $D_3$, the condenser voltage could reach such undesired high values for the following reason. Starting with the condition that the direct current main supply equals zero and the main thyristor $T_1$ as well as the auxiliary thyristor $T_4$ are ignited, the extinguishing capacity C loads up to the full voltage of the auxiliary voltage source. After the loading current dies away, $T_4$ changes to its blocking condition. After the ignition of the auxiliary thyristor $T_3$, the loading current of the condenser C flows through the free wheeling diode $D_2$, and the voltage at the condenser C builds itself up due to the energy stored in the inductance $L_3$ and reaches the same value as prior to the ignition of the auxiliary thyristor $D_3$ but with opposite polarity. After the ignition of $T_2$ and $T_3$, no change in the condenser voltage occurs because $T_3$ is occupying its blocking direction relative to the condenser voltage. However, after the ignition of $T_4$, the shifting current flows through $T_4$, $L_4$, C, $D_1$ and the source main supply and $U_H$. FIG. 1a shows the circuit as it exists in this instance of the current conducting control elements. If in FIG. 1 the main supply equals zero, practically only the condenser voltage and $U_H$ are arranged in series. In view of the stored energy in the inductance $L_4$, the condenser voltage shifts over and in this way in an auxiliary period of the output lines theoretically reaches the value 2 $U_H$. Due to this effect, the condenser voltage builds itself up to higher values than are furnished by the auxiliary sources $U_H$, when the voltage between the two direct current conductors 1, 2 is lower than that of the auxiliary voltage. The diode $D_1$ prevents the condenser voltage, under the above mentioned conditions, from materially increasing beyond the voltage of the auxiliary source $U_H$. When the voltage acting upon the commutating circuit is as high as the voltage between the two direct current conductors 1, 2 also the condenser voltage has said value. The problem of the building up thus consists only up to the time that the commutating circuit is supplied by the direct current main supply through the diode $D_4$.

Figure 1A:
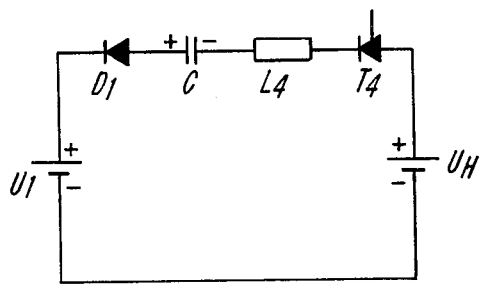
FIG. 1a shows the situation of the current conducting control elements at a certain instant of the operation of the circuit of FIG. 1.
Figure 2:
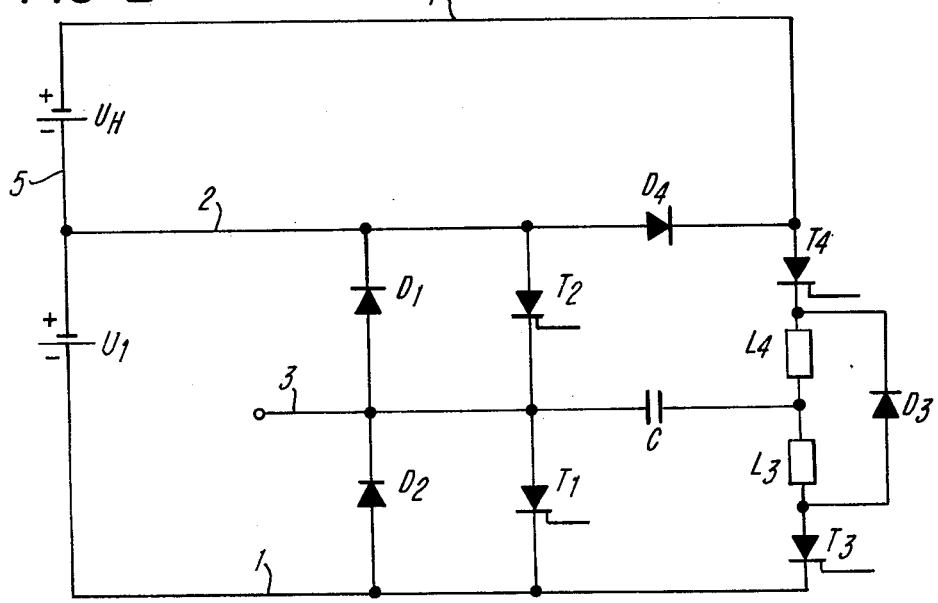
FIG. 2 represents an improvement over the arrangement of FIG. 1.

Referring now to the modification and improvement illustrated in FIG. 2, the elements having the same function as in the arrangement of FIGS. 1 and 1a are designated in FIG. 2 with the same reference characters as in FIGS. 1 and 1a. The ignition cycle for one period is the same as set forth in the above table with the heading "Ignition cycle for one period". The modulation is likewise effected in the manner outlined above in connection with FIGS. 1 and 1a. With fixed commutation inductances $L_3$ and $L_4$ and commutation capacity C, the number of current pulses is proportional to the size of the voltage applied to those terminals of the auxiliary thyristors $T_3$, $T_4$ which face away from each other. In order to make sure that this current pulse for commutation of the main thyristor will also at low voltage of the direct current main supply connected to the direct current conductors 1, 2 have a size sufficient for extinguishing the main thyristors $T_1$, $T_2$ and will increase with increasing main supply voltage, the voltage at $T_3$ and $T_4$ is delivered by the main supply $U_1$ and by an auxiliary voltage source $U_H$, and more specifically in such a way that this voltage at the auxiliary thyristors $T_3$ and $T_4$ consist of the addition of the voltages $U_1$ and $U_H$. Even when the voltage $U_1$ equals zero, therefore at the auxiliary thyristors $T_3$ and $T_4$ exists a sufficiently high voltage determined by the auxiliary voltage source $U_H$.

The positive terminal of the DC-Source of auxiliary positive voltage $U_H$ is connected to the anode of the thyristor $T_4$ via a first auxiliary conductor 4, and the negative terminal of the said DC-source of auxiliary positive voltage $U_H$ is connected to the second DC-supply conductor 2 via a second auxiliary conductor 5.

The diode $D_3$ serves to limit the voltage at the extinguishing condenser C to safe values. Without the diode $D_3$, the condenser voltage could under certain conditions of operation build itself up to undesirable high values.

In contradistinction to the circuit according to FIGS. 1 and 2, also the diode $D_4$ has with the circuit of FIG. 2 merely a protective function. The diode $D_4$ is provided for a disorder and it has the object in case the auxiliary source $U_H$ fails, to take over the current from the main supply or by a safety failure of the auxiliary source to dampen negative voltage peaks.

It is, of course, to be understood that the present invention is by no means limited to the specific showing in the drawings but also comprises any modifications within the scope of the appended claims.

What is claimed is:

1. In a thyristor load inverter circuit; a first DC-supply conductor at a fixed potential, a second supply conductor at a potential relative to the potential of the first supply conductor and variable between a predetermined minimum value near the potential of the first DC-supply conductor and a predetermined maximum value, an AC-output conductor, a first main thyristor connected between said AC-output conductor and said first supply conductor and poled toward the latter, a second main thyristor connected between said AC-output conductor and said second supply conductor and poled toward the former, a first auxiliary conductor connected to a source of auxiliary positive voltage having a value always essentially higher than the potential of the first DC-supply conductor, a second auxiliary conductor negative relative to said first auxiliary conductor and having a potential corresponding essentially to that of the first DC-supply conductor, a commutation branch having one end connected to said first auxiliary conductor and the other end connected to said second auxiliary conductor and comprising in series from said first to said second auxiliary conductors a first and second auxiliary thyristor, the auxiliary thyristors being poled toward said second auxiliary conductor, a capacitor connected between the juncture of said inductors and said AC-output conductor, means for supplying igniting control pulses alternately to said first and second main thyristors, and means for supplying igniting control pulses to said auxiliary thyristors in timed relation to the supply of igniting control pulses to said main thyristors to effect extinguishing of each main thyristor prior to ignition of the other thereof.

2. A thyristor load inverter circuit according to claim 1 in which the negative terminal of the said DC-Source of auxiliary positive voltage is connected to the said second auxiliary conductor.

3. A thyristor load inverter circuit according to claim 1 in which the negative terminal of the said DC-Source of auxiliary positive voltage is connected to the said second DC-supply conductor.

4. In a thyristor circuit; a first supply conductor at a fixed potential, a second supply conductor at a potential positive relative to the potential of the first supply conductor and variable between predetermined minimum and maximum values, an output conductor, a first main thyristor connected between said output conductor and said first supply conductor and poled toward the latter, a second main thyristor connected between said output conductor and said second supply conductor and poled toward the latter, a first auxiliary conductor connected to a source of positive voltage, a second auxiliary conductor negative relative to said first auxiliary conductor, a commutation branch having one end connected to said first auxiliary conductor and the other end connected to said second auxiliary conductor and comprising first and second auxiliary thyristors poled toward said second auxiliary conductor and a pair of inductors in serial arrangement interposed between said auxiliary thyristors, a capacitor connected between the juncture of said inductors and said output conductor, means for supplying igniting control pulses alternately to said first and second main thyristors, and means for supplying igniting control pulses to said auxiliary thyristors in timed relation to the supply of igniting control pulses to said main thyristors to effect extinguishing of each main thyristor prior to ignition to the other thereof, a diode connected between said second supply conductor and said first auxiliary conductor and poled toward the latter.

5. In a thyristor circuit; a first supply conductor at a fixed potential, a second supply conductor at a potential positive relative to the potential of the first supply conductor and variable between predetermined minimum and maximum values, an output conductor, a first main thyristor connected between said output conductor and said first supply conductor and poled toward the latter, a second main thyristor connected between said output conductor and said second supply conductor and poled toward the latter, a first auxiliary conductor connected to a source of positive voltage, a second auxiliary conductor negative relative to said first auxiliary conductor, a commutation branch having one end connected to said first auxiliary conductor and the other end connected to said second auxiliary conductor and comprising first and second auxiliary thyristors poled toward said second auxiliary conductor and a pair of inductors in serial arrangement interposed between said auxiliary thyristors, a capacitor connected between the juncture of said inductors and said output conductor, means for supplying igniting control pulses alternately to said first and second main thyristors, and means for supplying igniting control pulses to said auxiliary thyristors in timed relation to the supply of igniting control pulses to said main thyristors to effect extinguishing of each main thyristor prior to igniting of the other thereof, said first auxiliary conductor includes a diode between said source of positive voltage and said commutation branch and poled toward the latter.

6. In a thyristor circuit; a first supply conductor at a fixed potential, a second supply conductor at a potential positive relative to the potential of the first supply conductor and variable between predetermined minimum and maximum values, an output conductor, a first main thyristor connected between said output conductor and said first supply conductor and poled toward the latter, a second main thyristor connected between said output conductor and said second supply conductor and poled toward the latter, a first auxiliary conductor connected to a source of positive voltage, a second auxiliary conductor negative relative to said first auxiliary conductor, a commutation branch having one end connected to said first auxiliary conductor and the other end connected to said second auxiliary conductor and comprising first and second auxiliary thyristors poled toward said second auxiliary conductor and a pair of inductors in serial arrangement interposed between said auxiliary thyristors, a capacitor connected between the juncture of said inductors and said output conductor, means for supplying igniting control pulses alternately to said first and second main thyristors, and means for supplying igniting control pulses to said auxiliary thyristors in timed relation to the supply of igniting control pulses to said main thyristors to effect extinguishing of each main thyristor prior to ignition of the other thereof, a diode connected between said second supply conductor and said first auxiliary conductor and poled toward the latter, and in which said first auxiliary conductor includes a diode between said source of positive voltage and said commutation branch and poled toward the latter.

7. In a thyristor circuit; a first supply conductor at a fixed potential, a second supply conductor at a potential positive relative to the potential of the first supply conductor and variable between predetermined minimum and maximum values, an output conductor, a first main thyristor connected between said output conductor and said first supply conductor and poled toward the latter, a second main thyristor connected between said output conductor and said second supply conductor and poled toward the latter, a first auxiliary conductor connected to a source of positive voltage, a second auxiliary conductor negative relative to said first auxiliary conductor, a commutation branch having one end connected to said first auxiliary conductor and the other end connected to said second auxiliary conductor and comprising first and second auxiliary thyristors poled toward said second auxiliary conductor and a pair of inductors in serial arrangement interposed between said auxiliary thyristors, a capacitor connected between the juncture of said inductors and said output conductor, means for supplying igniting control pulses alternately to said first and second main thyristors, and means for supplying igniting control pulses to said auxiliary thyristors in timed relation to the supply of igniting control pulses to said main thyristors to effect extinguishing of each main thyristor prior to ignition of the other thereof, said second auxiliary conductor being connected to said first supply conductor.

8. A thyristor circuit according to claim 7 which includes a diode connected in parallel with said serially arranged inductors and poled toward said first auxiliary conductor.

9. A thyristor circuit according to claim 7 which includes a diode in parallel with each main thyristor and poled in a direction opposite to the main thyristor.

10. In a thyristor circuit; a first supply conductor at a fixed potential, a second supply conductor at a potential positive relative to the potential of the first supply conductor and variable between predetermined minimum and maximum values, an output conductor, a first main thyristor connected between said output conductor and said first supply conductor and poled toward the latter, a second main thyristor connected between said output conductor and said second supply conductor and poled toward the latter, a first auxiliary conductor connected to a source of positive voltage, a second auxiliary conductor negative relative to said first auxiliary conductor, a commutation branch having one end connected to said first auxiliary conductor and the other end connected to said second auxiliary conductor and comprising first and second auxiliary thyristors poled toward said second auxiliary conductor and a pair of inductors in serial arrangement interposed between said auxiliary thyristors, a capacitor connected between the juncture of said inductors and said output conductor, means for supplying igniting control pulses alternately to said first and second main thyristors, and means for supplying igniting control pulses to said auxiliary thyristors in timed relation to the supply of igniting control pulses to said main thyristors to effect extinguishing of each main thyristor prior to ignition of the other thereof, a source of voltage having the positive side connected to said first auxiliary conductor and the negative side connected to said first supply conductor, a diode connecting said second supply conductor to said first auxiliary conductor and poled toward the latter, said second auxiliary conductor being connected to said first supply conductor.

11. A thyristor circuit according to claim 10 which includes a diode in parallel with each main thyristor and poled in a direction opposite to the main thyristor.

* * * * *